United States Patent
Haga et al.

(10) Patent No.: US 7,819,770 B2
(45) Date of Patent: Oct. 26, 2010

(54) OSCILLATING INTERNALLY MESHING PLANETARY GEAR SYSTEM

(75) Inventors: Takashi Haga, Ohbu (JP); Yo Tsurumi, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 445 days.

(21) Appl. No.: 11/785,398

(22) Filed: Apr. 17, 2007

(65) Prior Publication Data

US 2007/0243967 A1 Oct. 18, 2007

(30) Foreign Application Priority Data

Apr. 17, 2006 (JP) .............................. 2006-112885

(51) Int. Cl.
*F16H 1/32* (2006.01)
(52) U.S. Cl. .................. 475/176; 475/163; 475/179
(58) Field of Classification Search ................. 475/163, 475/174, 176, 179
See application file for complete search history.

(56) References Cited

U.S. PATENT DOCUMENTS 768,574 A * 8/1904 Rice ............................ 384/497
4,574,659 A * 3/1986 Arndt ............................ 475/5
4,621,543 A * 11/1986 Gabilondo ................... 475/176
4,697,477 A * 10/1987 Barr ............................ 475/154
4,841,810 A * 6/1989 Lew ............................ 475/165
4,909,102 A * 3/1990 Haga ........................... 475/168
7,258,643 B2 * 8/2007 Jones .......................... 475/179

FOREIGN PATENT DOCUMENTS

JP 2000-065162 3/2000

* cited by examiner

*Primary Examiner*—Ha D. Ho
(74) *Attorney, Agent, or Firm*—Squire, Sanders & Dempsey, LLP

(57) ABSTRACT

An oscillating internally meshing planetary gear system is provided in order to improve basic performance and reduce cost at the same time. The oscillating internally meshing planetary gear system has an internal gear and external gears internally meshing with the internal gear and is configured such that one of the external gears and the internal gear is oscillatingly rotated by means of eccentric bodies formed in an input shaft (eccentric body shaft). The system includes: a sliding motion-facilitating member intervening between an outer periphery of the eccentric body and the oscillating gear; and an eccentric body shaft bearing supporting the eccentric body shaft. In addition to this, the eccentric body shaft bearing and the sliding motion-facilitating member have the same configuration.

7 Claims, 2 Drawing Sheets

Fig. 2
Replacement Sheet
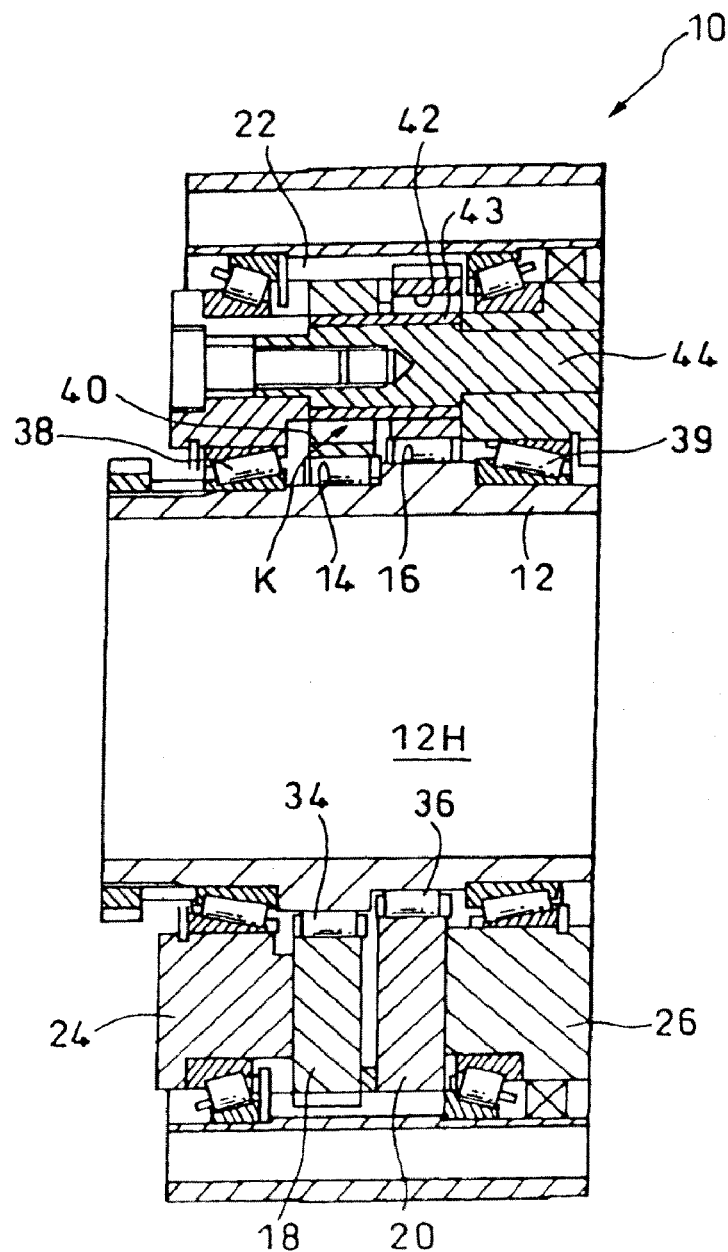
PRIOR ART

OSCILLATING INTERNALLY MESHING PLANETARY GEAR SYSTEM

BACKGROUND OF THE INVENTION

1. Field of the Invention

The present invention relates to an oscillating internally meshing planetary gear system.

2. Description of the Related Art

An oscillating internally meshing planetary gear system is widely used which has an internal gear and an external gear internally meshing with the internal gear. The gear system is configured such that one of the internal gear and the external gear is oscillatingly rotated by an eccentric body formed in an eccentric body shaft.

For example, a planetary gear system shown in FIG. 2 is disclosed in Japanese Patent Laid-Open Publication No. 2000-65162. This the planetary gear system 10 includes an input shaft 12, first and second eccentric bodies 14 and 16, first and second external gears 18 and 20, an internal gear 22, a relative rotation outputting mechanism K, and first and second supporting flanges 24 and 26 serving as an output element. In this instance, in order to achieve an increase in transmission capacity, the two first and second external gears 18 and 20 are arranged side by side in the axial direction.

The input shaft 12 is a hollow shaft having a large diameter hollow portion 12H and is disposed in a radially central portion of the planetary gear system 10. The input shaft 12 also serves as an eccentric body shaft, and each of the first and second eccentric bodies 14 and 16 is integrally formed with the outer periphery of the input shaft 12. The eccentric phases of the first and second eccentric bodies 14 and 16 are shifted relative to each other by 180 degrees.

The roller-shaped first and second sliding motion-facilitating members 34 and 36 intervene between the outer peripheries of the first and second eccentric bodies 14 and 16 and the first and second external gears 18 and 20, respectively. The input shaft (eccentric body shaft) 12 is supported by the first and second supporting flanges 24 and 26 through tapered roller bearings (eccentric body shaft bearings) 38 and 39.

The relative rotation outputting mechanism K is implemented by first and second inner pin holes 40 and 42 formed in the first and second external gears 18 and 20, respectively, an inner pin 44 passing through the inner pin holes 40 and 42, and an inner roller 43.

When the input shaft 12 is rotated by a motor (not shown), the first and second eccentric bodies 14 and 16 are eccentrically rotated integrally with the input shaft 12. Thus, while the input shaft 12 rotates one revolution, the external gears 18 and 20 mounted on the eccentric bodies 14 and 16, respectively, oscillate one cycle. Therefore, each of the first and second external gears 18 and 20 is rotated relative to the stationary internal gear 22 by an amount corresponding to the difference in the number of teeth from the internal gear 22. The relative rotation is outputted from the side of one of the first and second supporting flanges 24 and 26 as reduced speed output through the first and second inner pin holes 40 and 42, the inner roller 43, and the inner pin 44 (the relative rotation outputting mechanism K).

Also in the field of such planetary gear systems, there is a strong demand for improvement in basic performance and reduction in cost. Therefore, it is an object of the present invention to meet such a demand.

SUMMARY OF THE INVENTION

Various exemplary embodiments of this invention provides an oscillating internally meshing planetary gear system which has an internal gear and an external gear internally meshing with the internal gear and which is configured such that one of the internal gear and the external gear is oscillatingly rotated by an eccentric body formed on an eccentric body shaft. In order to solve the foregoing problems, the system comprises: a sliding motion-facilitating member intervening between an outer periphery of the eccentric body, and the internal gear or the external gear whichever is oscillatingly rotated; and an eccentric body shaft bearing for supporting the eccentric body shaft. Furthermore, the sliding motion-facilitating member has a configuration the same as that of the eccentric body shaft bearing.

The oscillating internally meshing planetary gear system must be configured such that the oscillating gear (the oscillating internal or external gear) is capable of smoothly sliding on the outer periphery of the eccentric body. Therefore, some kind of sliding motion-facilitating member often intervenes between the eccentric body and the oscillating gear.

The required function of the sliding motion-facilitating member (for example, how much torque is applied, how the thrust load is applied, or the like) is different from that of the eccentric body shaft bearing which supports the eccentric body shaft. Conventionally, these members are independently designed from totally different viewpoints, and the best components based on the most rational cost calculation are employed for each of the members.

However, in the present invention, the same configuration is intentionally employed for both the sliding motion-facilitating member and the eccentric body shaft bearing. As used herein, the term "same configuration" refers to that main body members (rolling elements) for realizing the functions of the bearings have common specifications, i.e., are the same.

If the same configuration is employed for both the sliding motion-facilitating member and the eccentric body shaft bearing, it apparently seems that the product quality of the sliding motion-facilitating member is unnecessarily high in qualitative point of view. However, the use of a high quality sliding motion-facilitating member in that portion can provide beneficial effects in terms of reduction in energy loss and improvement in rotation quality including reduction in vibration and noise in the whole system, on the level beyond imagination. Moreover, the advantage is obtained that such beneficial effects can be maintained for a long period of time (because the durability of the sliding motion-facilitating member is improved).

In addition to this, since only one kind of rolling element is employed, the number of components is reduced, and thus the burden of component inventory management and assembly control is reduced, whereby the total cost can be rather reduced. Therefore, when the kinds (shapes) of the rolling elements are the same, the advantage (described later) is also obtained that a simpler design can be employed in, for example, a method for mounting or positioning the components.

While the basic performance is improved, Furthermore, cost reduction can be achieved.

BRIEF DESCRIPTION OF THE DRAWINGS

FIG. 2 is a vertical cross-sectional view illustrating an example of a conventional internally meshing planetary gear system.

DETAILED DESCRIPTION OF THE PREFERRED EMBODIMENTS

Figure 1:
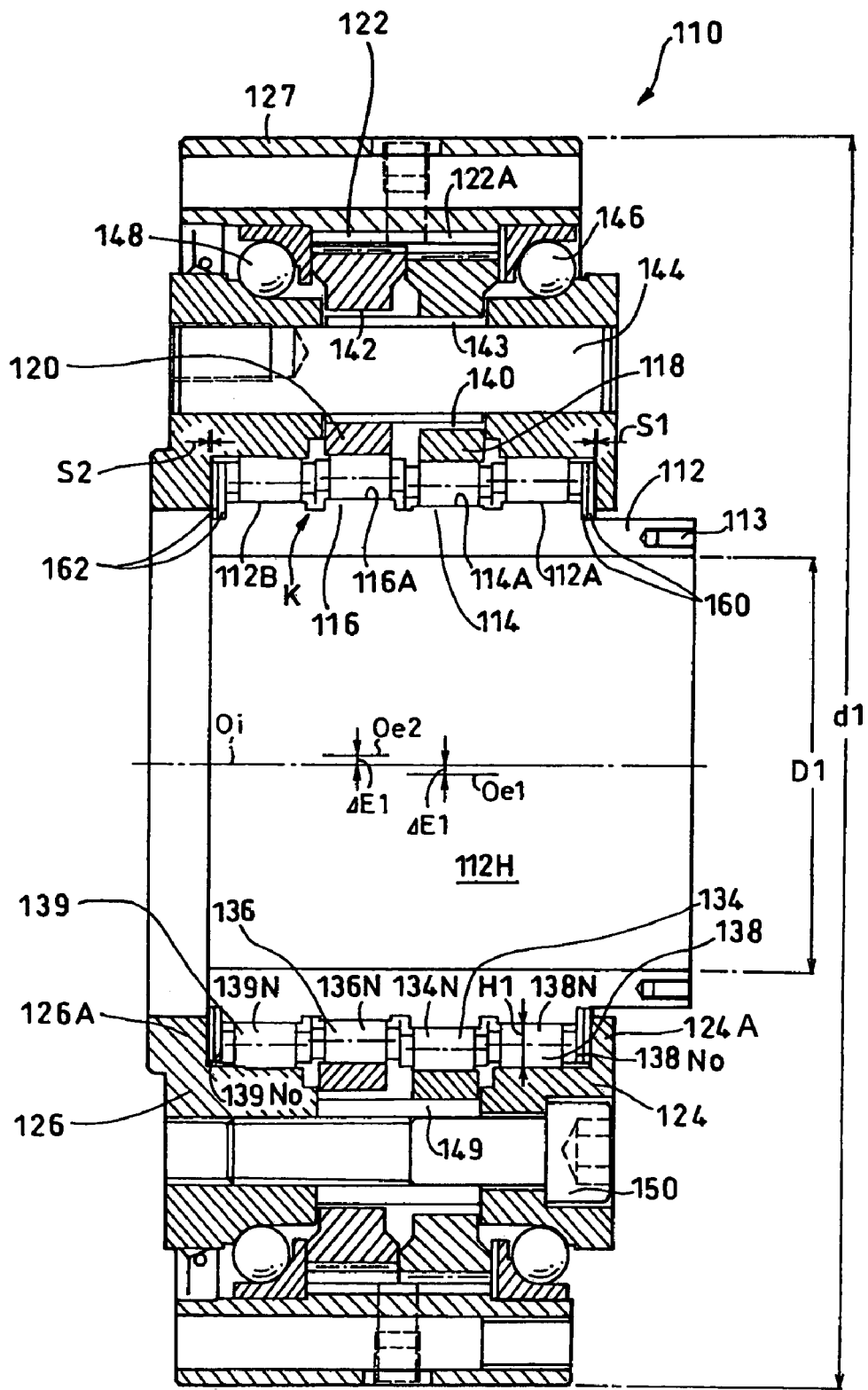
FIG. 1 is a vertical cross-sectional view illustrating an example of an internally meshing planetary gear system of an embodiment of the present invention.

Hereinafter, an example of an embodiment of the present invention is described in detail with reference to the drawings.

FIG. 1 is a vertical cross-sectional view corresponding to FIG. 2 and illustrating a planetary gear system of an example of an embodiment of the present invention.

First, a brief description is given. A planetary gear system 110 includes an input shaft 112, first and second eccentric bodies 114 and 116, first and second external gears 118 and 120, an internal gear 122, a relative rotation outputting mechanism K, and first and second supporting flanges 124 and 126 serving as an output element. In this instance, in order to achieve an increase in transmission capacity, the two first and second external gears 118 and 120 are arranged side by side in the axial direction.

The input shaft 112 is a hollow shaft having a hollow portion 112H and is capable of transmitting power through an output member on the side of a motor (not shown) disposed on the right side of the planetary gear system 110 in FIG. 1 and through a bolt (only a bolt hole 113 is illustrated). The input shaft 112 is disposed in a radially central portion of the whole system and serves also as an eccentric body shaft. Furthermore, the input shaft 112 is supported by the first and second supporting flanges 124 and 126 through eccentric body shaft bearings 138 and 139.

The eccentric body shaft bearings 138 and 139 are needle bearings. The first and second supporting flanges 124 and 126 serve also as the outer rings of the eccentric body shaft bearings 138 and 139, respectively, and the input shaft (eccentric body shaft) 112 serves as the inner ring thereof. That is, in the eccentric body shaft bearings 138 and 139, needles (needle-like rollers) 138N and 139N, which are main body members (rolling elements), directly contact the input shaft (eccentric body shaft) 112 and the first and second supporting flanges 124 and 126, respectively.

The first and second eccentric bodies 114 and 116 are formed integrally with the outer periphery of the input shaft 112 which also serves as the eccentric body shaft. Respective centers Oe1 and Oe2 of outer peripheries 114A and 116A of the eccentric bodies 114 and 116 are eccentric to shaft center Oi of the input shaft 112 by a predetermined amount ΔE1. The eccentric phases of the first and second eccentric bodies 114 and 116 are shifted relative to each other by 180 degrees.

The first and second external gears 118 and 120 are mounted on the outer peripheries 114A and 116A of the first and second eccentric bodies 114 and 116 through sliding motion-facilitating members 134 and 136, respectively. The sliding motion-facilitating members 134 and 136 are also needle bearings. The first and second external gears 118 and 120 also serve as the bearing outer rings of the sliding motion-facilitating members 134 and 136, respectively, and the first and second eccentric bodies 114 and 116 integrated with the input shaft (eccentric body shaft) also serve as the inner ring thereof. That is, also in the sliding motion-facilitating members 134 and 136, needles (needle-like rollers) 134N and 136N, which are main body members (rolling elements), directly contact the first and second eccentric bodies 114 and 116 and the first and second external gears 118 and 120, respectively.

The needles 134N and 136N serving as the rolling elements of the sliding motion-facilitating members 134 and 136, respectively, are composed of the same component as that of the needles 138N and 139N serving as the rolling elements of the eccentric body shaft bearings 138 and 139, respectively.

The external gears 118 and 120 have first and second pin holes 140 and 142, respectively, which pass through the external gears 118 and 120, respectively. An inner pin 144, having an inner roller 143 loosely fitted to the outer periphery thereof, passes through the first and second pin holes 140 and 142. The inner pin 144 is fitted into each of the first and second supporting flanges 124 and 126. The relative rotation outputting mechanism K is implemented by the loose fit structure formed from the inner pin holes 140 and 142 and the inner pin 144 (the inner roller 143).

Each of the first and second external gears 118 and 120 internally meshes with inner teeth (pins) 122A held by the single internal gear 122. The internal gear 122 is integrated with a casing 127.

The first and second supporting flanges 124 and 126 are supported by the casing 127 through angular bearings 146 and 148, respectively, and are integrated through a carrier bolt 150 with a spacer 149 intervening therebetween. The first and second supporting flanges 124 and 126 serve as the transmission surfaces (inner rings) of the angular bearings 146 and 148, respectively. Thus, the flanges 124 and 126 are subjected to quenching in order to form these transmission surfaces. When quenching for the transmission surfaces for the needles 138N and 139N is carried out at the same time, reduction in manufacturing cost and time can be achieved. In the present embodiment, the second supporting flange 126 serves as an output shaft for a mating machine (not shown).

A first step portion 124A is formed in the first supporting flange 124, and a second step portion 126A is formed in the second supporting flange 126. The sliding motion-facilitating members 134 and 136 and the eccentric body shaft bearings 138 and 139 are mounted so as to be adjacent to one another in the axial direction. Specifically, the needles 138N and 139N serving as the rolling elements of the eccentric body shaft bearings 138 and 139, respectively, and the needles 134N and 136N serving as the rolling elements of the sliding motion-facilitating members 134 and 136, respectively, are restrained from sliding and are positioned in the axial direction by thrust washers 160 and 162. The thrust washers 160 and 162 are mounted on the axially outermost end portions, i.e., an end portion 138No of the needle 138N and an end portion 139No of the needle 139, respectively. Here, two thrust washers 160 and two thrust washers 162 are arranged in the axial direction. A gap S1 is provided between the thrust washers 160 and the first step portion 124A of the first supporting flange 124, and a gap S2 is provided between the thrust washers 162 and the second step portion 126A of the second supporting flange 126. By means of only the above configuration, all the sliding motion-facilitating members 134 and 136 and the eccentric body shaft bearings 138 and 139 can receive a thrust load equally. The pairs of the thrust washers 160 and 162 are employed and disposed in order to obtain better sliding characteristics.

A description will now be given regarding the action of the planetary gear system 110.

When the input shaft 112 is driven to rotate by a motor (not shown), the first and second eccentric bodies 114 and 116 are eccentrically rotated integrally with the input shaft 112 (with mutually opposite phases). In this instance, the first and second external gears 118 and 120 are mounted on the outer peripheries 114A and 116A of the first and second eccentric bodies 114 and 116 through the sliding motion-facilitating members 134 and 136, respectively. Therefore, while the input shaft 112 rotates one revolution, each of the first and second external gears 118 and 120 oscillates one cycle. Therefore, each of the first and second external gears 118 and 120 is rotated relative to the stationary internal gear 122 by an amount corresponding to the difference in the number of teeth from the internal gear 122. The relative rotation is outputted from the sides of the first and second supporting flanges 124 and 126 through the first and second pin holes 140 and 142 and the inner pin 144 (the relative rotation outputting mechanism K). In this manner, a reduction in speed can be achieved which corresponds to a speed reduction ratio of (the difference in the number of teeth between the internal gear 122 and the first and second external gears 118 and 120)/(the number of teeth of the first and second external gears 118 and 120). The reduced speed output is provided to a mating machine from the side of the second supporting flange 126.

In this instance, a needle bearing is employed for each of the sliding motion-facilitating members 134 and 136 and the eccentric body shaft bearings 138 and 139. Furthermore, since each needle bearing is not provided with any dedicated inner and outer rings and is composed only of a rolling element, i.e., the needle 134N, 136N, 138N, or 139N, the radial height (thickness) H1 thereof is small. Hence, when the outer dimension dl of the planetary gear system 110 is the same as that of conventional system, the hollow portion 112H having the larger inner diameter D1 can be made. In other words, when the inner diameter D1 of the hollow portion 112H is the same as that of a conventional system, the outer dimension dl of the planetary gear system 110 can be made smaller than in the conventional system.

Furthermore, the eccentric body shaft bearings 138 and 139 and the sliding motion-facilitating members 134 and 136 are restrained from sliding and are positioned in the axial direction by the thrust washers 160 and 162. That is, the axially outermost end portions, i.e., the end portion 138No of the needle 138N and the end portion 139No of the needle 139N are restrained from sliding and are positioned in the axial direction by the thrust washers 160 and the thrust washers 162, respectively. Therefore, even when the thrust load from the input shaft 112 is applied in any axial direction, all the sliding motion-facilitating members 134 and 136 and the eccentric body shaft bearings 138 and 139 can receive the thrust load equally. Furthermore, since only the outermost end portions of the set of the four bearings 138, 139, 134, and 136 are held by the thrust washers 160 and 162, the configuration is simple. In addition, the thrust washers 160 and 162 intervene such that the gap S1 is provided between the thrust washers 160 and the first step portion 124A of the first supporting flange 124 and that the gap S2 is provided between the thrust washers 162 and the second step portion 126A of the second supporting flange 126. Therefore, the needles 134N, 136N, 138N, and 139N are not strongly interfered with each other in the axial direction, and thus very smooth rotation or oscillation is ensured at all times.

In the above embodiment, in order, particularly, to make the inner diameter D1 of the hollow portion 112H of the input shaft 112 as large as possible, each of the eccentric body shaft bearings 138 and 139 and the sliding motion-facilitating members 134 and 136 is composed of a needle bearing not having any dedicated inner and outer rings. However, in the present invention, the kind of the eccentric body shaft bearings and the sliding motion-facilitating members is not particularly limited to a needle bearing. Furthermore, the bearings may have components exclusively designed for the inner and outer rings.

Moreover, the input shaft (the eccentric body shaft) is not necessarily a hollow shaft having a hollow portion. The present invention is applicable to, for example, a solid shaft.

The present invention is also applicable to an internal tooth oscillating internally meshing planetary gear system in which an internal gear oscillates around an eccentric body, and the same effects can be obtained also in this case.

The present invention is applicable to internally meshing planetary gear systems for any application.

The disclosure of Japanese Patent Application No. 2006-112885 filed Apr. 17, 2006 including specification, drawing and claim are incorporated herein by reference in its entirety.

What is claimed is:

1. An oscillating internally meshing planetary gear system comprising:

an internal gear;

an external gear internally meshing with the internal gear, an eccentric body mounted on an eccentric body shaft; the system being configured such that one of the internal gear and the external gear is oscillatingly rotated by the eccentric body mounted on the eccentric body shaft;

a sliding motion-facilitating member intervening between an outer periphery of the eccentric body, and one of the internal gear and the external gear that is oscillatingly rotated; and an eccentric body shaft bearing configured to support the eccentric body shaft, wherein the sliding motion-facilitating member has a same configuration and a same size as that of the eccentric body shaft bearing, wherein the sliding motion-facilitating member and the eccentric body shaft bearing each comprises a needle bearing, and wherein the eccentric body shaft also serves as an inner ring of the needle bearing.

2. The oscillating internally meshing planetary gear system according to claim 1, further comprising a thrust washer configured to restrain the needle bearing from sliding in an axial direction, the thrust washer being arranged on an axially outermost end portion of the needle bearing such that a gap is provided between the thrust washer and an axial inner surface provided on a supporting member for supporting the eccentric body shaft bearing.

3. The oscillating internally meshing planetary gear system according to claim 2, wherein an axial position of the thrust washer is determined by the supporting member supporting the eccentric body shaft bearing.

4. The oscillating internally meshing planetary gear system according to claim 3, wherein a plurality of the thrust washers are stacked and arranged in the axial direction.

5. The oscillating internally meshing planetary gear system according to claim 1, wherein the eccentric body shaft is supported by two eccentric body shaft bearings, and the two eccentric body shaft bearings have the same configurations and the same sizes respectively as that of the sliding motion-facilitating member.

6. An oscillating internally meshing planetary gear system comprising:

an internal gear;

an external gear internally meshing with the internal gear, an eccentric body mounted on an eccentric body shaft; the system being configured such that one of the internal gear and the external gear is oscillatingly rotated by the eccentric body mounted on the eccentric body shaft;

a sliding motion-facilitating member intervening between an outer periphery of the eccentric body, and one of the internal gear and the external gear that is oscillatingly rotated; and an eccentric body shaft bearing configured to support the eccentric body shaft, wherein the sliding motion-facilitating member has a same configuration and a same size as that of the eccentric body shaft bearing, wherein the sliding motion-facilitating member and the eccentric body shaft bearing each comprises a needle bearing, and wherein the oscillatingly rotated gear and a supporting member configured to support the eccentric body shaft bearing also serve as respective outer rings of the needle bearings.

7. The oscillating internally meshing planetary gear system according to claim 6, wherein the supporting member is rotatably supported by a casing through a bearing and also serves as an inner ring of the bearing.

* * * * *